June 22, 1965  H. V. KNAUF, JR  3,189,980
APPARATUS FOR AND METHOD OF FABRICATING
ELECTRON TUBE STEMS
Filed June 13, 1960  7 Sheets-Sheet 1

INVENTOR.
HARRY V. KNAUF, JR.
BY
William A. Zalesak
ATTORNEY

June 22, 1965

H. V. KNAUF, JR 3,189,980

APPARATUS FOR AND METHOD OF FABRICATING
ELECTRON TUBE STEMS

Filed June 13, 1960

INVENTOR.
HARRY V. KNAUF, JR.
BY
William A. Zalesak
ATTORNEY

June 22, 1965 H. V. KNAUF, JR 3,189,980
APPARATUS FOR AND METHOD OF FABRICATING
ELECTRON TUBE STEMS
Filed June 13, 1960 7 Sheets-Sheet 6

INVENTOR.
HARRY V. KNAUF, JR.
BY
William A. Zalesak
ATTORNEY

United States Patent Office 3,189,980
Patented June 22, 1965

---

3,189,980
APPARATUS FOR AND METHOD OF FABRICATING ELECTRON TUBE STEMS
Harry V. Knauf, Jr., Mountainside, N.J., assignor to Radio Corporation of America, a corporation of Delaware
Filed June 13, 1960, Ser. No. 35,664
7 Claims. (Cl. 29—155.5)

This invention relates to an apparatus for and a method of fabricating electron tube stem assemblies which comprise a header wafer through which a plurality of lead-in conductors are sealed in vacuum-tight relation.

One form of stem assembly suitable for fabrication on apparatus made according to my invention comprises a small ceramic disk through which a plurality of bores are provided. The ceramic disk is provided with metalized surface coatings on the walls of the bores and around the outer peripheral cylindrical surface thereof. A plurality of fine wire conductors of differing lengths are inserted into or through the bores and brazed thereto. The brazing may be accomplished by depositing a small copper washer over each of the conductors and against one surface of the ceramic disk and then heating the assembly in a brazing furnace to cause the copper to melt and flow into the bores around the conductors therein. Such stem assemblies are used in various size electron tubes, some of which are very small and comprise a base wafer having a diameter no greater than 400 mils through which a number of conductors, each approximately 16 mils in diameter, are sealed.

Manual assembly of the stem structure described above requires precutting of different length leads and is not only tedious and slow, but often results in manufacturing shrinkage due to accidental distortion of the lead wire conductors, all of which gives rise to high manufacturing costs.

It is therefore an object of this invention to provide an apparatus for and a method of automatically or semi-automatically mechanically cutting the leads to predetermined different lengths and assembling a stem structure of the kind described for subsequent brazing.

According to my invention apparatus is provided in which a plurality of wires are fed through a fixture to position wires in a predetermined or selected parallel array. The wires are then longitudinally advanced into abutment with a plurality of positioner stops and then severed to desired lengths to provide a plurality of conductors of predetermined lengths disposed in a predetermined array. Cutter means for severing the wires may also serve as the fixture for positioning the wires in their predetermined array. The conductors, while being maintained in their predetermined array are then fed into a corresponding array of bores in the header wafer held in proper position on the apparatus. A like array of brazing washers are punched from a sheet and, while being maintained in their arrayal, are disposed over the conductors. The conductors are then individually and, if desired, differentially longitudinally positioned within the header wafer and subsequently brazed thereto.

*Product produced by apparatus and method of the invention*

Figure 1:
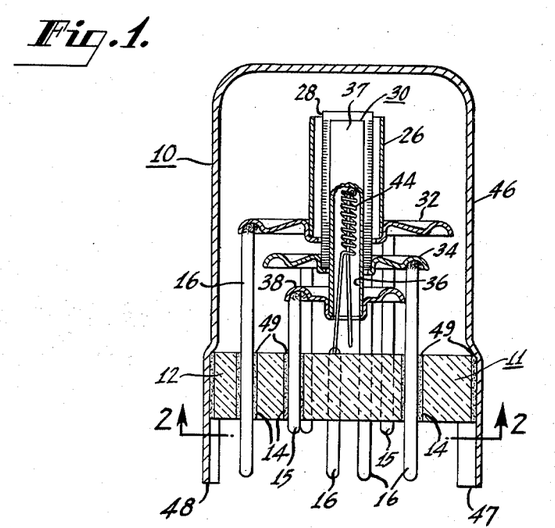
FIG. 1 is a longitudinal section of an electron tube incorporating a stem assembly which can be fabricated by the apparatus and method of my invention.
Figure 2:
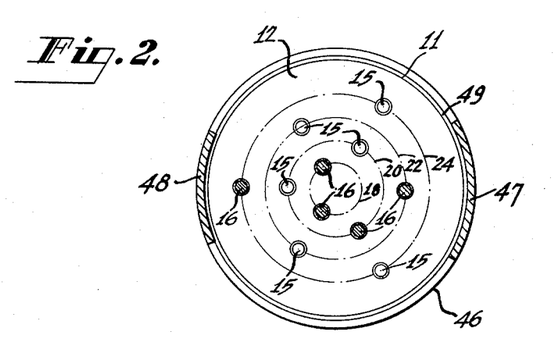
FIG. 2 is a bottom view taken along line 2—2 of FIG. 1.

FIGS. 1 and 2 show one form of an electron tube 10 having a stem 11 adapted to be fabricated according to the invention. The stem 11 of the tube 10 includes a ceramic disk header wafer 12 having a plurality of bores 14 through which a plurality of electrodes support conductors 15 and a plurality of lead-in conductors 16 are sealed in a vacuum-tight relation.

As shown in FIG. 2, the bores 14 are arrayed in four concentric circles 18, 20, 22, and 24 shown in phantom. Three bores are disposed in 120° equidistant relation on each of the three outer circles 20, 22, and 24; two bores, angularly spaced 120° from each other, are disposed on the inner circle 18. The bores in adjacent circles are angularly displaced 60° to provide maximum spacing therebetween.

The electron tube 10 comprises coaxial, cylindrical anode, grid, and cathode electrodes 26, 28, and 30, respectively. The anode 26 is mounted on a radially extending flange 32 which in turn is mounted on two support conductors 15 and one lead-in conductor 16, each of which extends into one of the bores on the outer circles 24. The grid electrode 28 is similarly mounted on a radially extended flange 34. The grid flange 34 is in turn mounted on a pair of support conductors 15 and a lead-in conductor 16, each of which extends into one of the bores on the circle 22. The cathode assembly 30 comprises a cathode support sleeve 36 and a surrounding emissive sleeve 37. The support sleeve 36 is mounted on a radially extending flange 38 which is in turn mounted on a pair of support conductors 15 and a lead-in conductor 16, each of which extends into one of the three bores on the circle 20. A coiled heater 44 is disposed in the cathode 30 and connects to a pair of lead-in conductors 16, which are sealed through the two bores 14 on the inner circle 18.

A vacuum-tight envelope is provided by a cup-shaped shell 46 which is sealed to the periphery of the header wafer 12. The shell 46 includes a pair of arcuate tongues 47 and 48 of different width, which serve to protect the externally extending lead-in conductors 16 and to facilitate socketing of the tube.

As described above, each of the anode, grid, and cathode electrodes is supported from the header wafer 12 on a set of three conductors onto the ends of which the electrode's support flange is seated. Each set of three conductors includes two support conductors 15 and a single lead-in conductor 16. In the case of each electrode the lead-in conductor 16 is the only one of the three conductors of a set which extends a substantial distance beyond the header wafer 12 externally of the tube. The two support conductors 15 of each set extend through the disk header 12 and externally therefrom only a very short distance. The support conductors 15 are not intended for use as electrical terminals.

In the fabrication of the electron tube 10, a metallic coating 49, such as molybdenum, is applied to the ceramic header 12 on its outer cylindrical periphery and on the walls of the bores 14. Such a coating may be applied by any suitable known metallizing process. The support and lead-in conductors 15 and 16 can thus be brazed to the walls of the bores 14 to provide vacuum-tight seals. Likewise, the envelope shell 46 can be brazed or soldered to the outer periphery of the header wafer 12 in vacuum-tight relationship to form a completed vacuum enclosure. The tube 10 is exhausted between the header wafer 12 and the shell 46 before the shell is soldered to the wafer. This is done in a vacuum furnace at the time this final solder seal is made.

By virtue of the structure of the electron tube 10, it will be appreciated that support and lead-in conductors 15 and 16 of various different lengths are provided. For example, in the case of a set of three conductors supporting any one electrode, the lead-in conductor 16 is somewhat longer than the two support conductors 15 because of its added terminal extension externally of the tube. Also, because electrode support flanges 32, 34, and 38 are spaced different distances from the ceramic disk header 12, the conductors for each electrode likewise have lengths greater or less than the conductors of the other electrodes. Accordingly, the method and apparatus of the present invention involves automatically providing such differential conductor lengths in the fabrication of the stem 11.

*General method of fabrication and apparatus therefor*

In FIGS. 3a–3k the apparatus, its positional sequence, and method according to my invention are illustrated. For purposes of clarity of description, the invention is described with reference to FIGS. 3a–3k illustrating the fabrication of a stem 11' including a header wafer 12' having only one support conductor 15' and one lead-in conductor 16'. It will, however, be appreciated that suitable apparatus can be provided according to the teaching herein set forth for fabricating multi-conductor stem structures such, for example as the stem 11 shown in FIGS. 1 and 2.

In FIGS. 3a–3f there is shown a positioner device 50 for positioning a plurality of wires 51 of an array of wires at mutually different longitudinal dispositions; a pair of cutters 52 having an upper blade 53 and a lower blade 54 for severing the wires so positioned; and a holding and transfer jig 55 for receiving the ceramic header 12'.

Figures 3A, 3B:
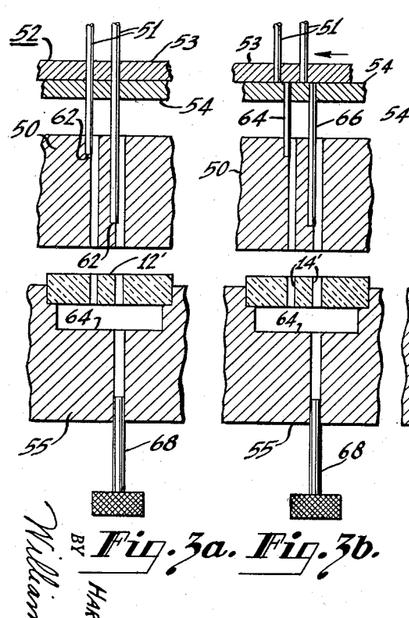
FIGS. 3a–3k are partial schematic section views of apparatus according to my invention illustrating the successive steps of the method of making a stem assembly according to my invention.
Figure 3C:
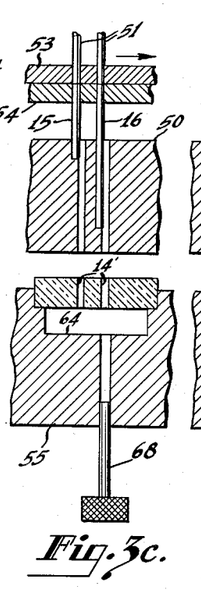

According to the invention wires 51 are fed, for example from supply spools (not shown), through aligned bores in the blades 53 and 54 of the cutters 52 and into end abutting contact with the positioner 50. The positioner 50 is provided with a plurality of bores therethrough, each of which includes an offset portion providing a shoulder stop 62 to longitudinally position the wires 51. The shoulder stops 62 are disposed at different distances from the cutter 52 so that the wires 51 are differentially longitudinally positioned, i.e., the ends of the wires are positioned at different distances from a common transverse plane e.g., the plane of the cutters 52. Accordingly, when positioned against the stops 62, the wires 51 are subsequently cut to provide one support conductor 15' and one lead-in conductor 16'. The conductors will, of course, be of different lengths.

Cutting of the conductors 15' and 16' is illustrated in FIG. 3b wherein the upper blade 53 is moved laterally to completely sever the wires 51. The upper blade 53 is then moved back to its original position as shown in FIG. 3.

Figure 3D:
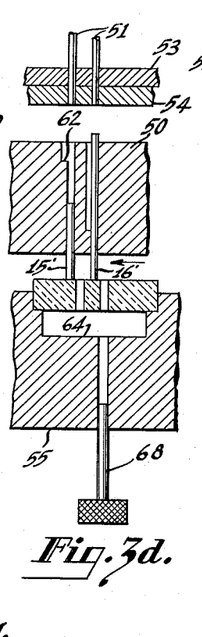

The positioner 50 is then shifted laterally to the left as viewed in FIG. 3d to a position as illustrated in FIG. 3d. During such shift the conductors 15' and 16' are retained against lateral movement by the lower cutter blade 54. Thus, when the positioner 50 has moved a distance sufficient to bring the lower portion of its bores into alignment with the conductors 15' and 16', the conductors drop downwardly to rest upon the upper surface of the header wafer 12' as shown in FIG. 3d. To insure dropping of the conductors 15' and 16', the wires 51 are advanced into the lower blade 54 to push the conductors 15' and 16' therefrom. This condition is also illustrated in FIG. 3d.

Figure 3E:
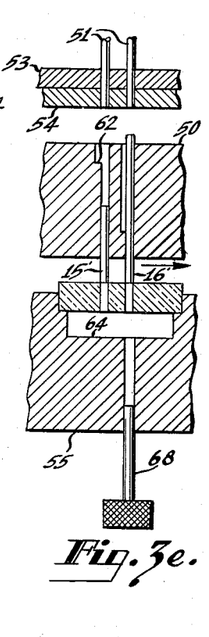

Then, as illustrated in FIG. 3e, the positioner 50 is laterally retracted to the right to its original position. This moves the conductors 15' and 16' into alignment with the bores 14' in the header wafer 12'.

Figure 3F:
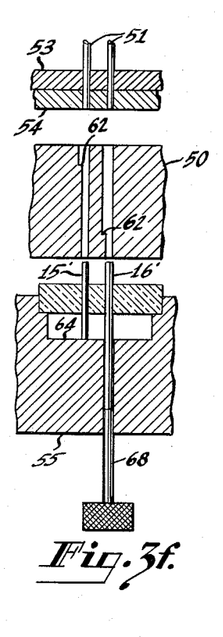

The jig 55 is then vibrated with a conventional vibrator (not shown) and the conductors 15' and 16' are caused to settle downwardly by gravity into and through the bores 14'. The support conductor 15' engages a fixed surface stop 64 of the jig 55, and the lead-in conductor 16' engages a push rod 68. The contact surfaces of the surface stop 64 and of the push rod 68, respectively, are differentially spaced from the header wafer 12' at predetermined locations. Thus, at this stage of fabrication of the stem 11', both the support conductor 15' and the lead-in conductor 16' are positioned with their upper ends extending equally a very short distance above the top surface of the ceramic wafer 12'.

Figure 3G:
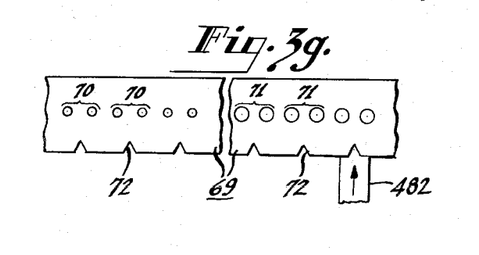
Figure 3H:
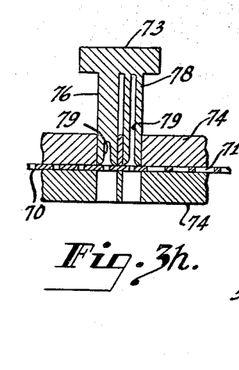

The required number of conductors having been cut to the required length and disposed in the header wafer 12', the jig 55 containing the header 12' and the conductors 15' and 16' is transferred to a brazing washer-puncher station. Thus, the jig serves the double function of both a holding device to support the stem 11' during its fabrication and also part of a transfer means to carry the partially fabricated stem to the second, or washer-punching, station. At this station small washers of a suitable brazing material are punched from a sheet and disposed over the upwardly extending ends of the conductors 15' and 16'. The washer punching operations are shown in FIGS. 3h to 3k. In FIG. 3g a strip of brazing material 69 is shown. The strip 69 prior to undergoing the punching process illustrated in FIGS. 3h to 3k is prepunched by apparatus not shown to provide sets of holes 70 therein in an array corresponding to the array of bores through the ceramic disk header 12'. Although in fabrication of the stem 11, this array would include eleven holes, the strip 69 is shown to comprise sets of two holes 70 each for schematic consistency with the fabrication of stem 11' illustrated in FIGS. 3a–3k. The strip 69 also includes a series of indexing notches 72 for alignment thereof in the punching apparatus. In FIG. 3g the strip 69 is shown having a portion which after the prepunching operation has had washers punched therefrom. Such washer punching leaves the enlarged holes 71 there in.

The punching apparatus illustrated in FIGS. 3h–3k comprise a punch 73 and a die 74. The punch 73 includes a plurality of punch rods 76 and 78, each of which is provided in the end thereof with a concentric bore 79 having a diameter sufficient for receiving one of the conductors 15' or 16'. The punch rods are arrayed identically with the arrays of the prepunched holes 70 in the strip 69 and of the bores 14' in the header wafer 12'. The die 74 is provided with a plurality of aligned bores in corresponding array.

Figure 3I:
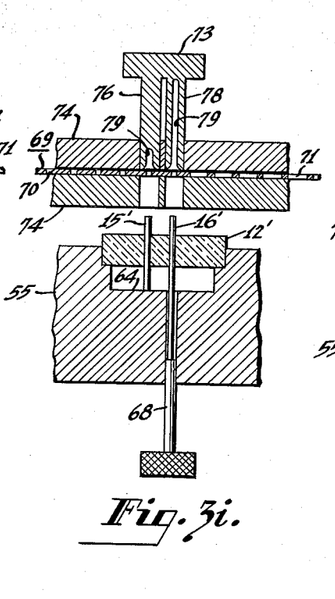

In the washer punching operation the jig 55 is positioned with the header wafer 12' and conductors 15' and 16' contained therein in alignment with the punch rods 76 and 78. The pre-punched strip 69 is disposed in the die 74 and one set of holes 70 therethrough is also aligned with the punch rods 76 and 78. This condition is illustrated in FIG. 3i.

Figure 3J:
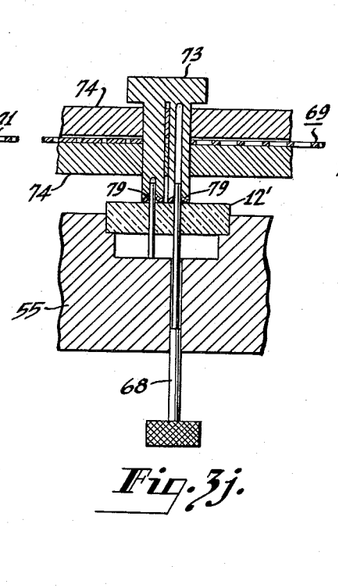

As shown in FIG. 3j, the punch 73 is actuated downward punching a pair of washers 79 out of the strip material 69. The punch 73 continues downward until the washers 79 are forced over the conductors 15' and 16' and against the header wafer 12'.

Figure 3K:
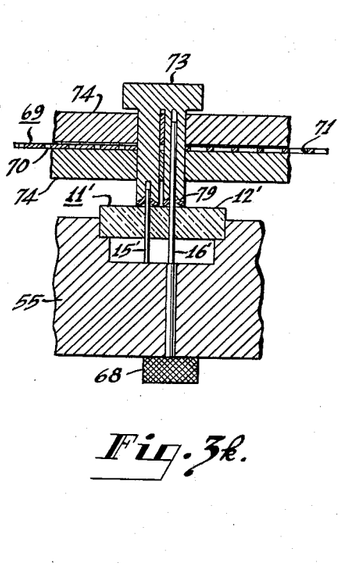

As illustrated in FIG. 3k, the punch 73 is maintained in its downward position and the push rod 68 is actuated upwardly to position the lead-in conductor 16' at its desired ultimate disposition relative to the ceramic disk header 12'. The portion of the lead-in conductor 16' now extending above the wafer 12', as shown in FIG. 3k, serves as a terminal prong in the finished tube. The support conductor 15' already having been positioned at its ultimate relative disposition with the ceramic disk header 12' is not moved. However, it will be noted that the raising of the lead-in conductor 16' brings the lower ends of the two conductors 15' and 16' into alignment in a common plane spaced from the ceramic disk header 12'. Thus, they are now suitably disposed to receive thereon an electrode support flange similar to the flanges 32, 34, or 38.

The punch 73 can then be retracted and the jig 55 removed. The assembled stem 11' including the ceramic header 12', the conductors 15' and 16', and the brazing washers 79 can then be removed from the jig 55 and integrated in a suitable brazing jig with the remaining parts of the electron tube for a final exhaust and brazing processing thereof.

*General overall apparatus*

Figure 4:
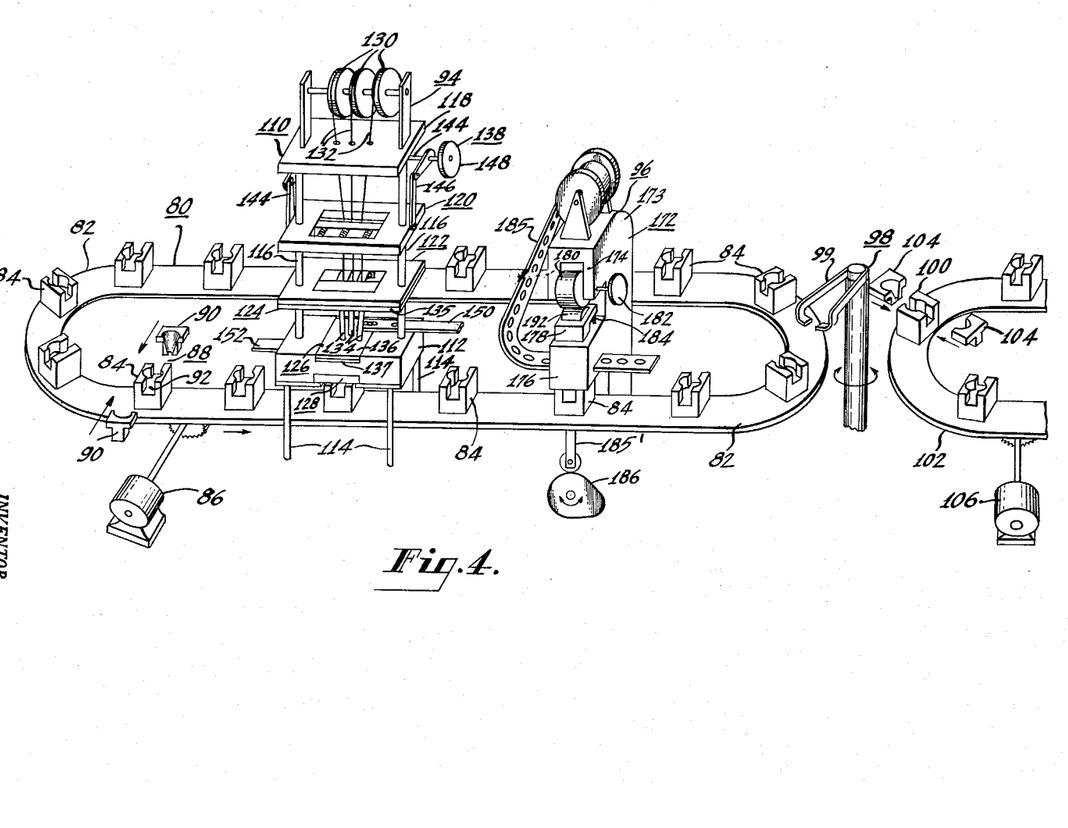
FIG. 4 is a partial schematic perspective view of apparatus according to my invention.

FIG. 4 illustrates one form of apparatus 80 according to my invention. The apparatus 80 comprises an endless conveyor 82 on which a plurality of assembly jigs 84 are mounted at spaced intervals. Drive and index means 86 is provided for advancing the endless conveyor 82 in uniform intermittent indexed movements so as to register the assembly jigs 84 at the various processing stations along the conveyor 82.

At a first processing station 88 a split funnel 90 is provided which includes two members having semi-conical recesses therein which can be moved together to form a loading funnel. The two pieces of the split funnel are provided with lower block portions of a suitable size to be slidably received within the openings 92 in each of the assembly jigs 84.

At second processing station 94 I provide a source of wires, means for feeding the wires, cutting them into predetermined lengths and disposing them in header wafers 12' carried by the assembly jigs 84. The steps of stem fabrication performed at the second processing station 94 are analogous to those described with reference to FIGS. 3a–3f.

At a third processing station 96 I provide apparatus for punching brazing washers from strip material and disposing the washers over the leads provided at the second processing station 94. The stem fabrication steps performed at the third processing station are analogous to those described with reference to FIGS. 3h–3k.

At a fourth processing station 98 I provide a transfer means 99 for gripping an assembled stem 11', lifting it from its assembly jig 84, and transferring it onto an empty brazing jig 100 on a second endless conveyor 102. A second split funnel 104 similar to the funnel 90 is provided for facilitating loading of the assembled stem 11' into the brazing jigs 100. After transfer of the assembled stem 11' into the brazing jigs 100, the assemblies are transported by the endless conveyor 102 to a brazing furnace (not shown). Drive and index means 106 is provided for moving the second endless conveyor 102 in uniform intermittent indexed movements. The two drive means 86 and 106 are synchronized to permit the unloading, transfer, and loading operations at the fourth processing station 98.

Figure 11:
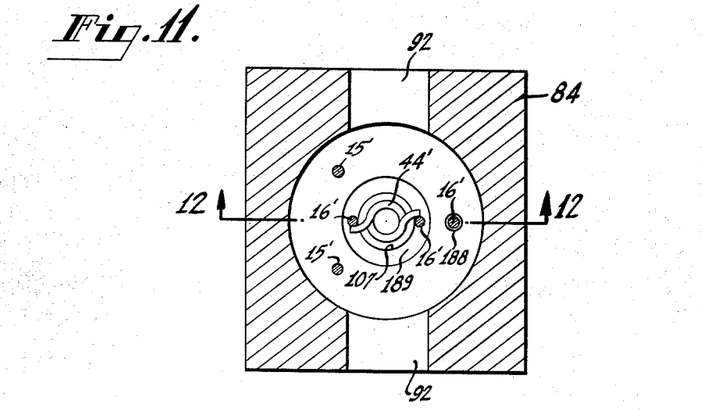
Figure 12:
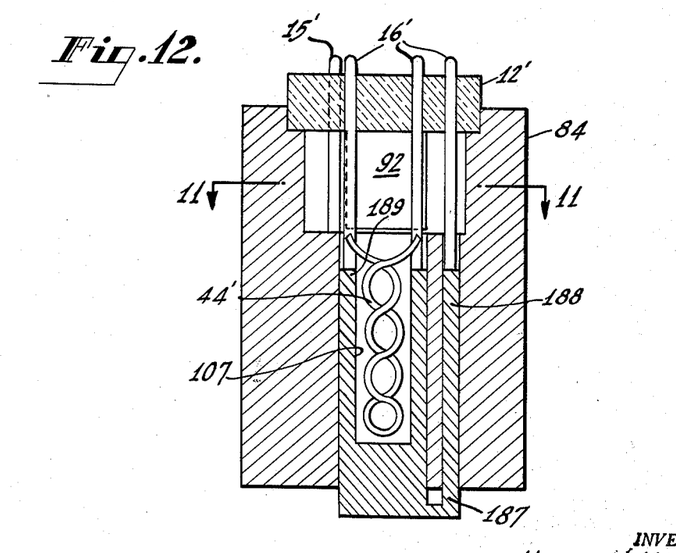

To fabricate a stem 11', a ceramic header wafer 12' is prepared by disposing a pair of proper length lead-in conductors 16' through accommodating bores in the wafer 12' and connecting a heater 44' thereto. (See FIGS. 11 and 12.) Assembly of the heater 44' and its conductors 16' into the header wafer 12' may be done manually. This comprises a preprocessing step prior to the operations described with reference to FIGS. 3a–3k. After this preprocessing assembly, the wafer 12' together with its heater 44' and its two lead-in conductors 16' is then placed in an assembly jig 84 on the endless conveyor 82 at the first processing station 88. An assembly jig 84 is indexed and registered at the first processing station 88 and the two halves of the split funnel 90 are closed thereupon. The resulting funnel serves as a guide for positioning the heater 44' into a central tubular recess 107 of the assembly jig 84 as shown in FIG. 12. After the heater 44 has been guided into this central tubular recess, the two halves of the split funnel 90 are separated to permit the ceramic disk header 12' to be seated in the assembly jig 84.

The endless conveyor 82 is then indexed so as to bring an assembly jig 84 loaded with a disk header 12', heater 44', and the heater conductors 16' into registration at the lead cutting station 94. As a jig is registered at the lead cutting station 94, it is brought into contacting operational relationship with a vibrator (not shown). As described with reference to FIG. 3d, this vibrator insures that lead-in conductors which have been dropped into the bores of the ceramic header wafer 12' will be settled downwardly into contact with their associated stops. This procedure is representatively described with reference to FIG. 3f. After the proper leads have been cut and disposed into the ceramic header wafer 12' in the jig 84 and settled therethrough, the endless conveyor 82 is again indexed to bring a jig into registration at the brazing washer punching station 96. After the proper brazing washers have been punched and disposed over the conductors, the endless conveyor 82 is again indexed to move the now completely assembled stem 11' on toward the transfer station 98.

*Lead cutting station apparatus*

Lead cutting apparatus 110 at the second processing station 94 includes a housing 112 supported on four legs 114 and a pair of vertical columns 116 extending upwardly from the housing. Mounted on the columns 116 from top to bottom is a spool table 118, a wire feed unit 120, a wire check unit 122, and a wire guide unit 124. A cutter unit 126 is set in the top of the housing 112 and a conductor positioner unit 128 is set in the bottom of the housing.

To prepare the lead cutting apparatus 110 to fabricate a stem 11 (FIG. 1), wires are fed from spools 130 and threaded through an array of bores through the extending spool platform 118 and disposed in a straight line. Although nine conductors would be provided in fabricating the stem 11, for the purpose of describing the invention, the lead cutting apparatus 110 is shown to include only three spools 130 and associated wires 132. It will, however, be understood that greater or fewer number of wires 132 and wire supply spools 130 can be provided.

After feeding the wires 132 through the bores in the spool table 118, they are fed through the feed unit 120 and then through the check unit 122. To this point the three wires 132 remain disposed in their original straight line array. As the wires 132 emerge from the check unit 122, they are threaded into support tubes 134 mounted in a support plate 135 of the guide 124. The support tubes 134 are bent so as to alter the disposition of the wires from a planar array to an array generally corresponding to the bores 14 in the ceramic disk header 12'. The support tubes 134 thus feed the wires 132 to a region adjacent a pair of shearing dies 136 and 137 of the wire cutters 126.

In operation of the lead cutting apparatus 110, the wires 132 are gripped by the feed unit 120 and advanced downwardly through the check unit 122, the guide tubes 134, the cutters 126, and into the positioner 128 and into abutting contact with differentially spaced stops provided therein. The nature of these stops is illustrated in FIGS. 3a–3f which show the wires 51 against such stops in the positioner 50. After each of the wires 132 has been advanced into abutment with its associated stop in the positioner 128, the feed unit 120 is retracted upwardly. The action of the feed unit 120 and check unit 122 are described more fully hereinafter. During the retraction of the feed unit 120, the check unit 122 acts to grip the wires 132 and prevent their upward movement. The frictional wire gripping of the feed unit 120 is overcome and the feed unit 120 slides upwardly relative to the wires 132.

Figure 5:
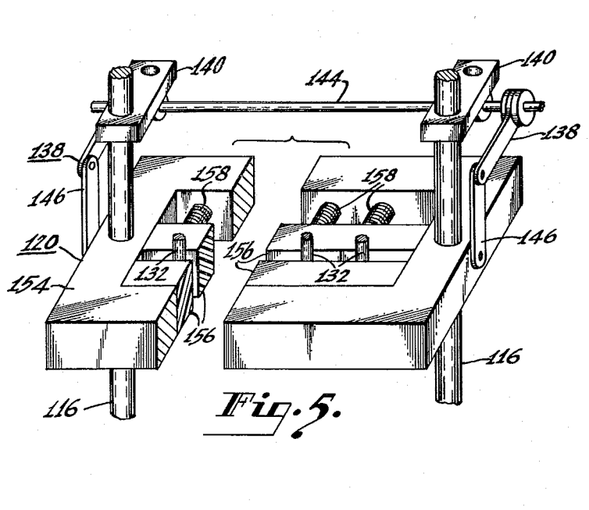
FIG. 5 is a perspective view with parts broken away of the wire feed unit of the lead cutting and loading apparatus of FIG. 4.

Vertical movement of the feed unit 120 along the columns 116 is provided by the mechanism 138 (see FIG. 5). The mechanism 138 comprises a bracket 140 fixed to each of the columns 116. A shaft 144 is rotatably mounted in these brackets. A pair of two-arm linkages 146 are fixed to the shaft 144 and pivotally attached to the feed unit 120. Actuation of the shaft 144 by a hand wheel 148 fixed thereto serves to move the feed unit 120 vertically along the columns 116.

The check unit 122 is fixed against vertical movement along the columns 116. The check unit comprises means for permitting the wires 132 to be slidably advanced therethrough in a downward direction but to exert a greater frictional grip against upward movement of the wires 132 than is exerted by the feed unit 120, described in greater detail below.

After the wires 132 have been moved into abutment with their stops in the positioner 128, the cutters 126 are actuated as representatively illustrated in FIG. 3b by a cutter hand lever 150. A lateral shifting of the positioner 128 as illustrated in FIG. 3d to permit the severed conductors to fall from their stops and onto the ceramic header wafer 12' therebeneath is provided by actuation of a positioner hand lever 152.

*Feed unit*

The feed unit 120 (see FIG. 5) comprises a support plate 154 mounted between the two vertical columns 116. The support plate 154 is provided with a central opening into which a pair of blocks 156 which may be made of a plastic, such as nylon plastic, are mounted. A plurality of compression springs 158 serve to urge the two nylon plastic blocks 156 toward each other. In operation of the feed unit 120, the wires 132 are threaded between the two blocks 156 and gripped therebetween by action of the compression springs 158. The gripping of the wires 132 by the feed unit 120, being of a frictional nature, is dependent upon the material of the blocks 156 and the pressure exerted by the compression springs 158. Actuation of the drive means 138 serves to slidably move the feed unit 120 along the columns 116 pulling the wires 132 therealong.

*Check unit*

Figure 6:
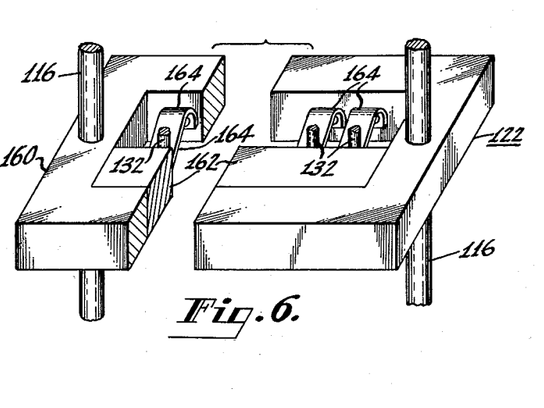
FIG. 6 is a perspective view with parts broken away of the wire check unit of the lead cutting and loading apparatus of FIG. 4.

FIG. 6 illustrates the check unit 122 in detail. A support plate 160 is mounted between the two vertical columns 116. The support plate 160 is provided with a central opening into which a pressure block 162 and a plurality of leaf springs 164 are disposed. The leaf springs 164 are secured to the inner wall of the support plate 160 and are spring biased such that their ends bear against the facing surface of the pressure block 162. The leaf springs 164 contact the pressure block 162 at a slight angle and extend therefrom upwardly from the horizontal. Accordingly, a frictional check device is provided wherein a wire may be drawn or pushed downwardly between the pressure block 162 and one of the springs 164 but will be firmly gripped against an upward movement therethrough.

*Cutter and positioner*

Figure 7:
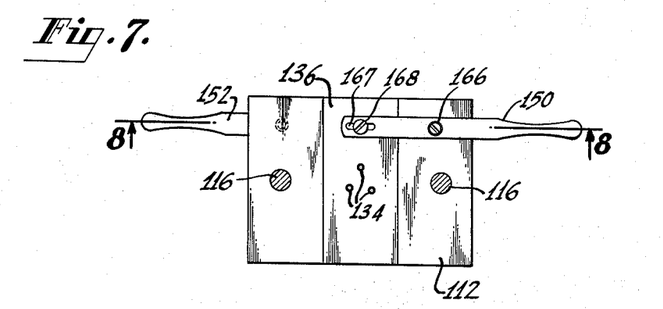
FIGS. 7–9 are enlarged top plan, section, and bottom plan views, respectively, of a portion of the lead cutting and loading apparatus of FIG. 4.
Figure 8:
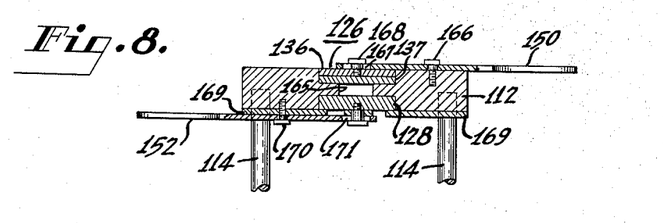
Figure 9:
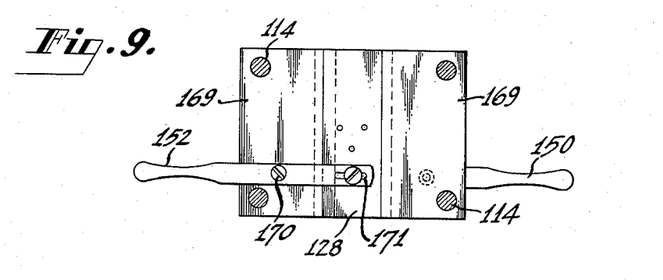

Details of the cutter and positioner mechanisms 156 and 128 is illustrated in FIGS. 7–9. The housing 112 is shown to comprise a relatively massive block having a central aperture 165 therethrough and slot-like recesses in each of the upper and lower surfaces. The housing 112 is supported on the four support legs 114 at each of its four corners and in turn supports the two vertical columns 116 from points adjacent opposite ends thereof.

The two shearing dies 136 and 137 are set in the recess of the upper face of the housing 112. The lower shearing die 137 is fixed relative to the housing while the upper shearing die 136 is slidable relative thereto. Slidable movement of the upper shearing die 136 is provided by the cutter lever 150. The lever 150 is pivotally mounted on the housing 112 by a pin 166 and includes a slot 167 at an end thereof into which a pin 168 fixed in the upper shearing die 137 is disposed.

The positioner 128 is mounted in the recess in the lower surface of the housing 112 and is slidable therein. A pair of retainer plates 169 are fixed to the bottom of the housing 112 to maintain the positioner 128 in place. Slidable movement of the positioner 128 is provided by the positioner lever 152 which is pivotally mounted to the housing 112 by a pin 170. Like the cutter lever 150, the positioner lever 152 includes a slot and pin arrangement 171 at its end.

In operation, wires 132 are fed through the tubes 134, through the shearing dies 136 and 137, and against the stops of the positioner 128. This procedure is described with reference to FIG. 3a. Actuation of the cutter lever 150 results in conductors being cut from the wires 132 as described with reference to FIG. 3b. Shifting of the positioner 128 to permit further advance of the conductors is provided by actuation of the positioner lever 152. This step is analogous to that described with reference to FIG. 3d.

*Washer punching apparatus*

As shown in FIG. 4, washer punching apparatus 172 comprises a frame 173 having a pair of arms 174 and 176 extending horizontally therefrom. The frame 172 is so disposed that the lower arm 176 extends over the endless conveyor 82 into operative relationship with the assembly jigs 84 passing therebeneath.

Figure 10:
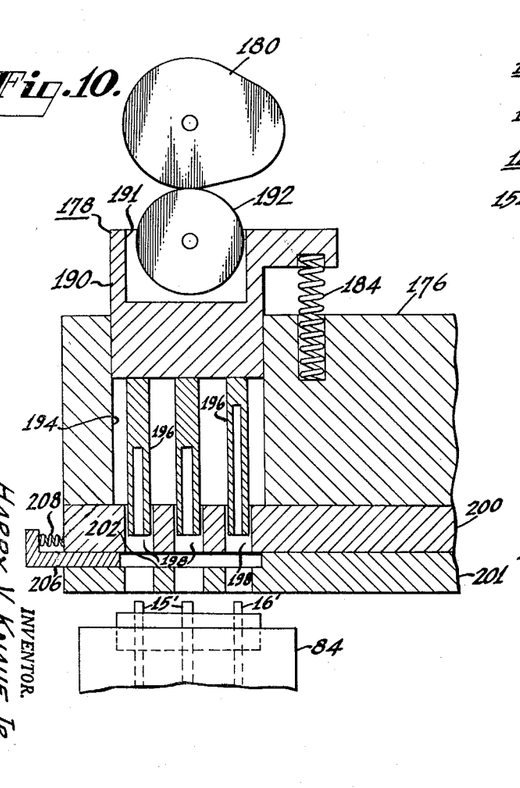
FIG. 10 is an enlarged section of the punching mechanism of the brazing washer punching apparatus of FIG. 4.

A punching mechanism 178 (FIGS. 4 and 10) is slidably mounted for vertical movement in the lower arm 176 and is disposed in co-operating relationship with an actuating eccentric cam 180 rotatably mounted in a yoke portion of the upper arm 174. A hand wheel 182 is fixed to the shaft supporting the cam 180 to permit actuation thereof. Rotation of the cam 180 serves to drive the punching mechanism 178 downwardly. The punching mechanism 178 is returned upwardly by a compression spring 184 (FIG. 10). A ribbon 185 of prepunched brazing material similar to the ribbon 69 of FIG. 3g is fed through a slot in the lower arm 176 below the punching mechanism 178. Washers punched from the ribbon 185 are disposed over a set of conductors 15' and 16' as described with reference to FIGS. 3h–3k.

Also illustrated in FIG. 4 is a plunger 185' and an actuating cam 186 adapted for movement upwardly through the conveyor 82 to lift the lead-in conductors 16' into their ultimate position as illustrated with reference to FIGS. 3j and 3k. The plunger 185 is adapted to co-operate with a positioner rod 187 (FIG. 12) of the jigs 84 similar to the operation of rod 68 illustrated in FIGS. 3a–3k.

As shown in FIG. 12, the positioner rod 187 includes slidable rod portions 188 and tubular portions 189 which contact all of the lead-in conductors 16', including the two to which the heater 44' has been previously attached.

FIG. 10 illustrates in greater detail the punching mechanism housed in the lower arm 176 of the washer punching apparatus 172. The punching mechanism 178 comprises a block 190 having a recess 191 in the top portion thereof into which a roller 192 is mounted. The roller extends upwardly out of the recess 191 into co-operative relationship with the actuating cam 180. The block 190 is vertically slidable in a bore 194 of the lower arm 176. A plurality of tubular punches 196 depend from the block 190 and are slidably disposed in a plurality of bores 198 in a pair of die plates 200 and 201. A surface slot 202 is provided in the lower die plate 201 for receiving a prepunched strip of brazing material such as is illustrated in FIG. 3g or FIG. 4. A finger 206 is mounted in the slot 202 and urged inwardly by tension spring 208. The finger 206 is provided with a V-shaped point (see FIG. 3g) for co-operating with the V-shaped notches 72 in the brazing strip for providing an indexing thereof with respect to the array of tubular punches 196.

Actuation of the cam 180 serves to drive the punching mechanism 178 downwardly and through the brazing material punching washers therefrom which are carried downwardly and over the ends of the conductors 15' and 16' extending upwardly out of the ceramic disk header 12 positioned therebeneath in aligned registration.

I claim:

1. The method of assembling an electron tube stem comprising a wafer of insulating material having a plurality of conductors extending therethrough including the steps of simultaneously differentially longitudinally positioning the ends of all of the wires of an array of parallel wires in a predetermined mutual longitudinal relationship, simultaneously severing said wires in a common plane spaced from their said ends to provide an array of parallel conductors of different lengths, and thereafter, without disrupting the mutual arrayal of said conductors, moving said conductors for simultaneously and individually aligning said conductors with a like array of parallel bores in said wafer, and then disposing said conductors through said wafer bores.

2. The method of fabricating an electron tube stem including a header wafer of insulating material having an array of bores therethrough and a plurality of conductors sealed through said bores, said method comprising the steps of arranging a plurality of wires into a mutually parallel array corresponding to the array of said bores through said wafer simultaneously differentially longitudinally positioning the ends of said wires in a predetermined mutual longitudinal relationship, simultaneously severing said wires in a common plane spaced from their ends to provide a like array of parallel conductors of different lengths, then, without disrupting the mutual arrayal of said conductors, disposing said conductors into vertical alignment with said bores and vibrating said conductors and wafer relative to each other for causing said conductors to drop into said bores.

3. The method of fabricating an electron tube stem including a header wafer of insulating material having an array of bores therethrough provided with metalized walls and a plurality of conductors sealed through said bores, said method comprising the steps of arranging a plurality of wires into a mutually parallel array corresponding to the array of said bores through said wafer, simultaneously differentially longitudinally positioning the ends of said wires in a predetermined mutual longitudinal relationship, simultaneously severing said wires in a common plane spaced from their ends to provide a like array of parallel conductors of different lengths, then, without disrupting the mutual arrayal of said conductors, disposing said conductors into vertical alignment with said bores and vibrating said conductors and wafer relative to each other for causing said conductors to drop into said bores, thereafter differentially adjusting the longitudinal disposition of said conductors relative to one another in said bores, and fusion bonding said conductors to said wafer in vacuum-tight relation therewith.

4. The method of fabricating an electron tube stem including a wafer of insulating material having bores therethrough provided with metalized walls and parallel conductors extending through said bores and sealed therein, the ends of said conductors on one side of said wafer being differentially spaced from said wafer, said method comprising arranging a plurality of wires into a mutually parallel array corresponding to the array of bores through said wafer, simultaneously cutting said wires into different lengths to provide an array of conductors of different lengths, then simultaneously advancing said array of conductors into said metalized bores and positioning the one ends of said conductors which lie on one side of said wafer in a common plane spaced from said wafer, simultaneously disposing a bonding material washer over each of said conductors and against said one side of said wafer, thereafter longitudinally moving some of said conductors for disposing the said one ends thereof in a plane spaced a further distance from said wafer than said common plane, and heating the assembly of said wafer, said washers, and said conductors to fusion bond said conductors vacuum-tight to said wafer.

5. The method of fabricating an electron tube stem comprising the steps of arranging a plurality of wires into a mutually parallel array, simultaneously cutting said wires into different lengths to provide an array of conductors of mutually different lengths, disposing said array of conductors into a like array of metalized wall bores in a wafer member of insulating material with the ends of said conductors which are disposed on one side of said wafer lying in a common plane spaced from said wafer, aligning said conductors with a plurality of hollow punches in a like array, disposing a strip of fusion bonding material between said punches and said conductors, moving said punches through said strip and towards said conductors for punching out and transferring a plurality of washers and simultaneously disposing said washers one each onto each of said conductors and against said one side of said wafer, thereafter longitudinally moving some of said conductors for disposing the said ends thereof out of said common plane and at a further distance from said one side of said wafer, and heating the assembly of said wafer, said conductors, and said washers to fusion bond said conductors vacuum-tight to said wafer.

6. The method of assembling an electron tube stem including an insulating wafer having a plurality of bores therethrough in a predetermined spaced array through which a corresponding plurality of conductors are sealed in a vacuum-tight relation, said method comprising the steps of disposing a plurality of parallel wires in predetermined spaced array and in alignment with a like array of stops differentially spaced from a reference plane, disposing a wafer having a like array of bores therethrough in said plane and with said array of wires parallel to but misaligned with respect to said wire array, advancing said wires into engagement with said stops for positioning the leading ends of said wires predetermined and mutually different distances from said wafer, then simultaneously severing all of said wires at a common plane spaced from said wafer to provide a plurality of conductors of different wire lengths in an array corresponding to said array of bores, then moving said leads and said stops relative to one another for misaligning said leads and stops, aligning said array of conductors with said array of bores, and then disposing said conductors into said bores.

7. The method of fabricating an electron tube stem which includes a ceramic wafer, a plurality of bores having metalized walls and a plurality of conductors sealed through said bores in a predetermined spaced parallel array, said method comprising the steps of disposing a plurality of parallel wires in said array and in alignment with a like array of stops differentially spaced from a reference plane, disposing said wafer into said reference plane and with said bores laterally translationally shifted by a predetermined distance from a position aligned with said wire array, individually longitudinally advancing each of said wires into engagement with said stops for positioning said wires into predetermined positions relative to said wafer such that each of said wires is spaced from said wafer a distance different than another of said wires, simultaneously severing all of said wires in a common plane spaced from said wafer to provide a plurality of conductors of different wire lengths in an array corresponding to said array of bores, then moving said wires and said stops relative to one another for misaligning said wires and stops and freeing said wires for further advance, then laterally translationally shifting said array of conductors to align said array of conductors with said array of bores, longitudinally advancing said conductors through said bores and disposing one end of each of said conductors in a common plane on one side of said wafer and spaced therefrom, aligning said conductors with a plurality of hollow punches in a like array and disposing a punched strip of brazing material therebetween, moving said punches towards said conductors for punching brazing material washers from said strip and for transferring and simultaneously disposing said washers around said conductors, thereafter longitudinally moving some of said conductors for disposing the said one ends thereof out of said common plane and spaced a further distance from said one wafer side, and heating the assembly of said wafer, said conductors, and said brazing washers to braze the conductors to said wafer in vacuum-tight relation therewith.

References Cited by the Examiner

UNITED STATES PATENTS

| | | | |
|---|---|---|---|
| 2,199,852 | 5/40 | Iden | 29—25.2 |
| 2,202,500 | 5/40 | Lopp | 25—155.55 X |
| 2,246,931 | 6/41 | Chiffey | 29—155.55 |
| 2,308,606 | 1/43 | Ingerson | 29—500 X |
| 2,328,712 | 9/43 | Domke | 164—69.1 |
| 2,398,230 | 4/46 | Keller | 164—69.1 |
| 2,464,405 | 3/49 | Knauf | 29—155.55 |
| 2,609,875 | 9/52 | Zuck | 164—69.1 |
| 2,641,212 | 6/53 | Meilstrup | 29—155.55 X |
| 2,977,667 | 4/61 | Schnering | 29—25.2 |
| 3,004,565 | 10/61 | Hanson | 83—198 X |
| 3,007,760 | 11/61 | Knauf et al. | 113—99 X |
| 3,020,635 | 2/62 | Redgrift | 29—155.55 X |
| 3,045,712 | 7/62 | Moeller | 29—155.55 X |

WHITMORE A. WILTZ, *Primary Examiner.*

THOMAS E. BEALL, *Examiner.*